June 18, 1935.  W. POOL  2,005,390
SHUTTLELESS LOOM AND THREAD MEASURING AND CUTTING MECHANISM THEREFOR
Filed Dec. 16, 1933    2 Sheets-Sheet 1
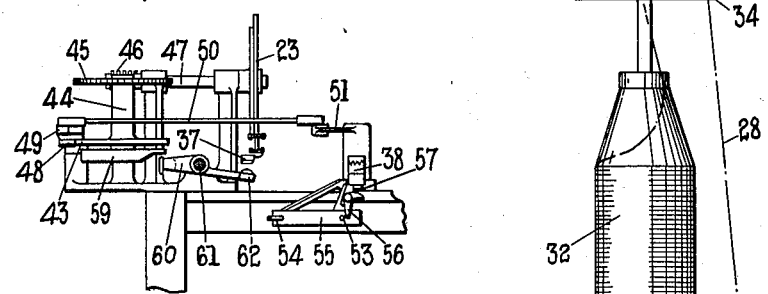
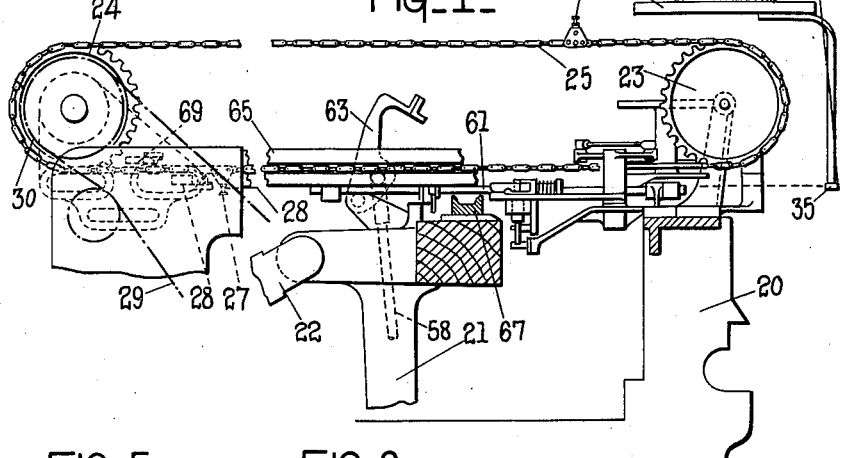
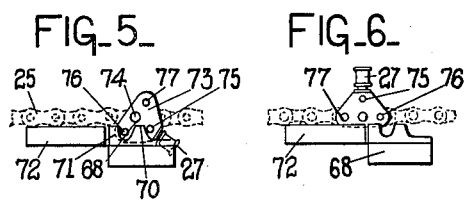
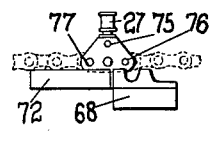
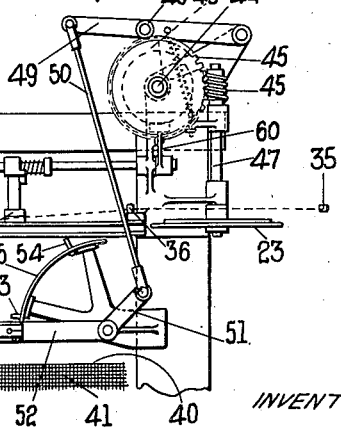
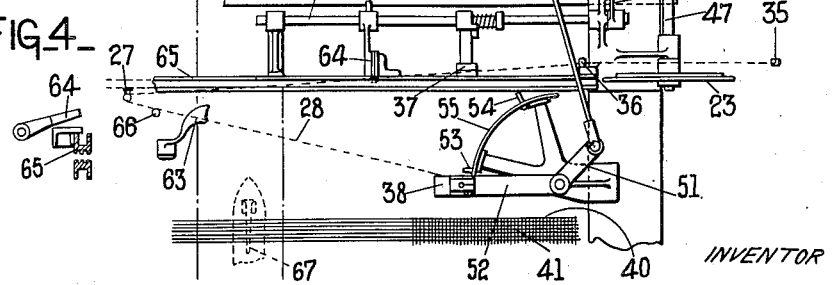
INVENTOR
William Pool
BY
J. Seltzer and [illegible]
ATTORNEYS June 18, 1935.  W. POOL  2,005,390
SHUTTLELESS LOOM AND THREAD MEASURING AND CUTTING MECHANISM THEREFOR
Filed Dec. 16, 1933  2 Sheets-Sheet 2
FIG_7_  FIG_9_  FIG 11
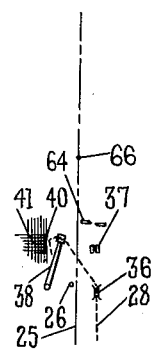 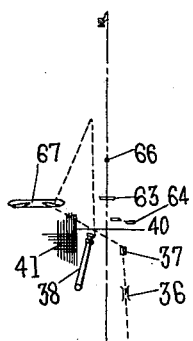 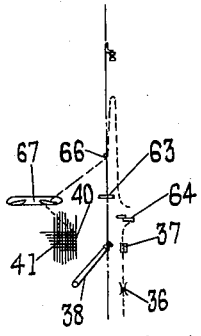
FIG_8_  FIG_10_  FIG_12_
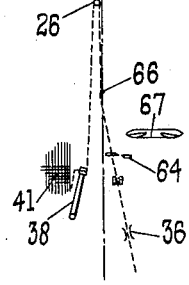 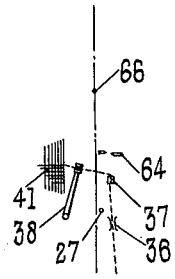 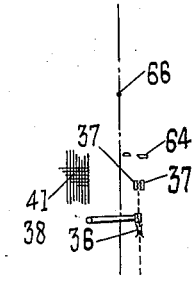
FIG_13_  FIG_14_  FIG_15_  FIG_16_  FIG_17_
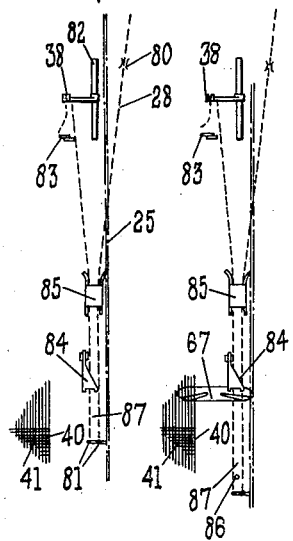 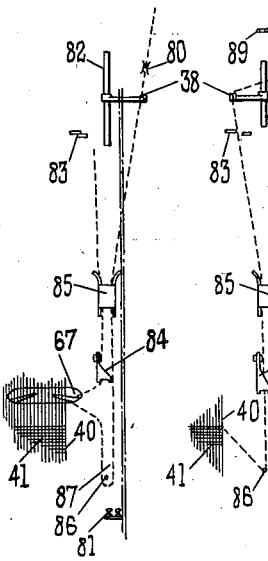 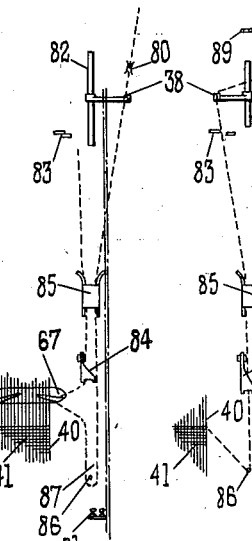 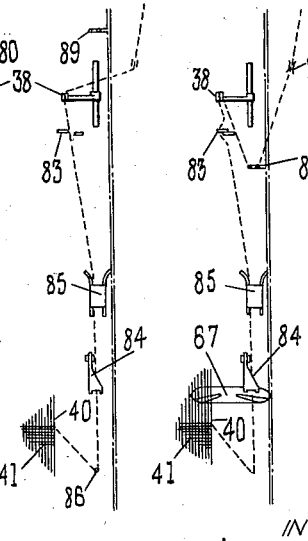 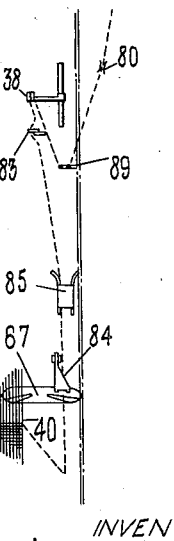
INVENTOR
William Pool
BY
ATTORNEYS Patented June 18, 1935

2,005,390

UNITED STATES PATENT OFFICE 2,005,390

SHUTTLELESS LOOM AND THREAD MEASURING AND CUTTING MECHANISM THEREFOR

William Pool, Spondon, near Derby, England, assignor to Celanese Corporation of America, a corporation of Delaware Application December 16, 1933, Serial No. 702,764
In Great Britain December 31, 1932

9 Claims. (Cl. 139—126)

This invention relates to shuttleless looms, that is looms in which the weft supply does not pass through the shed, and has particular reference to mechanism for drawing measured lengths of weft from the supply prior to engagement of the weft by the inserting means.

The object of the invention is to simplify weft measuring mechanism, especially as regards its number of operative moving parts, and also to prepare the weft for insertion into the shed with the minimum of handling of the thread during such operation.

U. S. Patent No. 1,925,336 describes weft measuring and cutting mechanism which, in conjunction with a plurality of trapping devices, e. g. a pair of such devices moving successively into position (as by being carried on a single rotatable member as described in U. S. application S. No. 484,785 filed 27th September, 1930) enables simple loops of weft to be drawn at the side of the loom of such length that sufficient weft is available for each loop to furnish two consecutive picks. This mechanism comprises cutting means some distance from the side remote from the supply of the trapping device by which one limb of the loop is held so that that limb (constituting the second to be inserted from that particular loop) is cut short of the trapping device so as to leave a length of weft which with the length extending from the edge of the fabric is just sufficient for a second pick to reach across the fabric, while a tail of weft is left extending beyond the trapping device to constitute the additional length of weft required to be available for the first pick to be inserted from the next succeeding loop. This shortening of the second limb and lengthening of the first limb of the loops takes place as each trapping device moves successively into position for loop formation.

It has now been found that adjustment of the relative lengths of two consecutive picks can be similarly effected where, instead of a plurality of successively operating trapping devices being employed to bring the weft into position for loop formation, a single moving trapping device performs this function. Further, such adjustment can be effected whether each loop drawn for weft is of a length sufficient for two picks, or whether separate loops are drawn for successive picks.

The weft measuring mechanism according to the invention, therefore, comprises a drawing member, a single movable trapping device adapted to carry the weft across the path of the drawing member, and cutting means adapted to sever loops thus drawn from the supply with unequal limb length.

Where each loop is of length sufficient for two picks, it is conveniently drawn towards the fell of the fabric, a finger being inserted into the completed loop near the fell to restrain the second limb while the first limb is inserted. Cutting of the second limb of each loop is effected at some distance along its length, so as to make is shorter than the first limb, so that the shorter limb, together with the end extending from the edge of the fabric after insertion of the pick provided by the first limb, is sufficient to make the second pick.

Where the loop is of length sufficient for a single pick only, the cutting takes place on alternate loops, so that (as with the two-pick loop) the picks are inserted in pairs which are connected together at the edge of the fabric, and bind the edge to form a selvedge. Here again, the cutting occurs at some distance along the limb which is cut, so that the second of a pair of connected loops is shorter than the first, and, together with the length extending from the edge of the fabric after insertion of the first loop, is no more than conveniently sufficient to make the second pick. The remainder of the cut limb goes to form part of the next succeeding loop, which is the first of the next pair, and enables it not only to reach across the fabric to form a pick, but also to stretch from the edge of the fabric via the trapping mechanism to the supply.

In addition to the moving trapper a fixed trapper may be provided to control the weft coming from the supply while it is not being held by the moving trapper.

If desired the severance may be effected at an adjustable distance from the moving trapping device so as to provide ready means of adjustment of the limb lengths in accordance with the width of fabric to be woven. Thus, a varying length of tail may be left projecting from the trapping device to augment the length of weft available in the first limb of the succeeding loop to form the first pick inserted from that loop.

For substantial continuity of weft withdrawal compensated draw-off means may be employed as described in U. S. application S. No. 585,479 filed 8th January, 1932. Similar weft measuring mechanism may be employed on each side of the loom so that picks of weft can be laid from each side alternately, the loops of pairs of connected picks forming a selvedge at each side of the fabric.

The loops of weft drawn by the weft drawing mechanism are caused to engage with weft inserting means, such as a dummy shuttle, a weft depressor being conveniently provided to depress the appropriate limb of each loop into engagement. Where sufficient weft for two picks is drawn in each loop, each limb of the loop is depressed in turn for insertion. Where each loop is sufficient for a single pick, the limb selected for depression is preferably such that the whole length of the pick is caused to run through the inserting means, so that any chance of premature release of the weft from such means is avoided.

The latter form of mechanism is especially suited for use in looms having stationary shuttle boxes as described in U. S. application S. No. 675,406 filed 12th June, 1933. It should be understood however that it may also be used with looms of ordinary type having shuttle boxes carried by the slay, or with any other type of suitable weft inserting means.

While the weft drawing mechanism of the invention is described herein as it is employed for weaving with one kind of weft from each side of the loom or the same weft from the two sides of the loom, a plurality of mechanisms each employing a single moving trapping device may be employed at each side of the loom with a corresponding number of wefts so as to enable, in a manner similar to that described in U. S. application S. No. 702,765 filed Dec. 16, 1933, patterning or weft mixing to be carried out.

By way of example weft drawing mechanism according to the present invention will be described in greater detail with reference to the accompanying drawings in which, Figure 1 is a side elevation of the loop drawing and trapping means according to the invention.

Figure 2 is a plan view of Figure 1.

Figures 3-6 are detail views of the apparatus shown in Figures 1 and 2.

Figures 7-12 are diagrammatic plan views of the steps of loop drawing and insertion.

Figures 13-17 are diagrammatic views similar to Figures 7-12 of the drawing and insertion of a loop sufficient for two picks.

Referring to Figures 1-6, the loom shown therein comprises a frame 20 with a slay 21 driven by means of a crank 22. Chain sprockets 23 and 24 are provided at the front and rear of the loom to carry a drawing chain 25 on which are mounted pegs 26 and 27 for drawing loops of thread 28, each sufficient for a single pick. The rear sprocket 24 is driven by means of a chain 29 and sprocket 30, from the main shaft of the loom.

The weft thread 28 comes from a stationary supply package 32 mounted on a bracket 33, and passes over a guide disc 34 and down to two thread guides 35 and 36. Two trappers 37 and 38 are provided, one of which, 37, is stationary, and may grip the thread 28 proceeding directly from the guide 36, while the other 38 is movable, and may occupy a position close to the selvedge 40 of the fabric 41 as shown in Figure 2, or may move to grip the thread 28 close to the guide 36 as it extends between that guide and the stationary trapper 37.

The movements of the trapper 38 are effected by means of a cam 43 mounted on a shaft 44 which is rotated by means of a worm wheel 45 and a worm 46 on the shaft 47 carrying and driven by the front chain sprocket 23. The cam 43 engages a cam bowl 48, whose rotation is transmitted by levers and links 49, 50, 51 to the arm 52 carrying the trapper 38. The opening of the jaws of the trapper 38 is effected by means of pegs 53, 54 projecting from a quadrant 55 beneath the path of the trapper. As shown in Fig. 3 the pegs 53 and 54 engage an L-shaped member 56 moving with the trapper 38 and acting on a spring loaded plunger 57 which opens the jaws of the trapper. The peg 53 opens the jaws when the trapper 38 is close to the selvedge 40, the cam 43 causing the trapper to move slightly into engagement with the peg 53 when opening at this point is necessary. The peg 54 momentarily opens the jaws preparatory to the gripping of the thread near the guide 36. On the return movement of the trapper 38, the pegs 53 and 54 are not effective, the member 56 then turning idly away from the plunger 57.

The stationary trapper 37 is opened and closed by means of a cam 59 on the shaft 44, which cam acts on a lever 60 fixed to a shaft 61 carrying the lower jaw 62 of the trapper 37. The shaft 61 also carries a cutter 64 which cuts the thread at a point beyond the trapper 37. The cutter 64 is shown in Figs. 2 and 4. The cutter 64 may be slid along the shaft 61 to adjust the position of cutting in accordance with the width of the fabric being woven, and is secured to the shaft by means of a set screw 31. The trapper 37, and cutter 64 are operated simultaneously by the rotation of the shaft 61. A depressor 63 is provided on the slay to depress the thread 28 when drawn into loop form into engagement with a dummy shuttle 67. The depressor 63 is actuated by a rod 58 carried by the slay.

A chain guide 65 is provided to conduct the lower run of the chain 25. The pegs 26 and 27 on the chain 25 extend from it to different distances on the same side, so that alternate loops are drawn on opposite sides of a guide peg 66, which guides the thread 28 coming obliquely from the trapper 38 or the guide 36. On reaching a release member 68, the pegs 26, 27 are inverted to release the loops they have drawn, and are turned back to their former position by means of a resetting member 69.

The release member 68 comprises two teeth 70, 71, and a spring 72. The pegs 26, 27 are each mounted on a plate 73, pivotally attached to the chain 25 at 74, and bearing three pins 75, 76, 77. The pin 75 engages with the tooth 70 and causes the plate 73 to pivot about the point 74, till the peg 76 enters between the teeth 70, 71. Further progress of the chain 25 brings the pin 76 into contact with the tooth 71, and turns the plate 73 further till it has rotated 180°, when the pin 76 disengages from the tooth 71, further rotation of the plate 73 being prevented by contact of the pin 77 with the spring blade 72. The rotation of the plate 73 releases the loop of thread 28, but the plate 73 and peg 26 or 27 must be re-set before it returns to the front end of the loom. Re-setting is effected by means of the member 69 (Fig. 1) which is like the member 68, but has teeth pointing downwardly instead of upwardly. By means of the member 69 the plate 73 is turned back again through 180° to its former position.

The operation of the device is shown diagrammatically in Figures 7-12. In these figures, the plane of separation of the jaws of the trapper 38 is shown as if it were at right angles to the plane of the paper for convenience of illustration. Actually, as shown in Figures 1—4, the plane of separation should be in the plane of the paper, which enables the engagement and disengagement of the threads 28 with the trapper 38 to take place without difficulty. Figure 7 shows the thread 28 proceeding from the guide 36 to the moving trapper 38, ready to be engaged by the peg 26 on the chain 25 and to be drawn out into a loop on the left of the guide peg 66 as shown in Figure 8.

In Figure 9, the depressor 63 has depressed the limb of the loop engaging with the peg 66 into engagement with a dummy shuttle 67. At the same time the trapper 38 has been opened, and the trapper 37 closed. At this time also, the cutter 64 is operated, but the thread 28 has been guided by the peg 66 out of its reach, so that cutting is not effected. The insertion of the thread 28 into the shed by means of the shuttle 67 draws the thread again into the jaws of the trapper 38, as shown in Figure 10. The peg 27 on the chain 25 then draws a second loop on the right of the peg 66, as is shown in Figure 2. The trapper 37 is opened before such drawing takes place.

The depressor 63, cutter 64 and trapper 37 are now operated again. By reason of the fact that the loop is drawn to the right of the peg 66, the depressor now depresses the left hand limb thereof, into engagement with the dummy shuttle 67, and the right hand limb lies in reach of the cutter 64, and is severed just beyond the trapper 67. On severance, the jaws of the trapper 37 close to retain control over the cut end of weft. This is shown in Figure 11. In Figure 12, the trapper 38 swings round to grip the thread 28 between the guide 36 and the trapper 37, after which it returns to the position shown in Figure 7, the trapper 37 opening, and the cycle is repeated. A similar cycle has taken place on the other side of the fabric 41, so that in all, four picks of weft are inserted, two from each side.

Figures 13–17 show the loop drawing, cutting and inserting steps in a loom provided with drawing means adapted to draw loops each sufficient for two picks. The drawing apparatus comprises a guide 80 for the thread 28, a drawing chain 25 carrying pairs of pegs 81, a moving trapper 38 carried on a rod 82, a cutter 83, a deflector 84, and guide means 85. In addition, a finger 86 is provided which may be inserted and withdrawn from the loop of weft 87 when desired.

Figure 13 shows a loop 87 almost fully drawn between the guide 80 and the moving trapper 38. In Figure 14, the loop 87 is fully drawn, and the finger 86 is inserted into it. The trapper 38 is opened, and the deflector 84 has depressed one limb of the loop 87 into engagement with a dummy shuttle 67 which is moving across the fabric 41. In Figure 15 the trapper 38 has been moved by the turning of the rod 82 to a position close to the guide 80, where it seizes the thread, and carries it back across the line of the chain 25, as shown in Figure 16. The first pick is now fully inserted, and the second pick extends between the trapper 38 and the finger 86, passing under the deflector 84. The depressor then depresses the second pick into engagement with the dummy shuttle 67, and simultaneously the cutter 83 severs the pick, and allows it to be inserted. Meanwhile, a further loop 87 is begun by the peg 89 on the chain 25, before the former loop is completely inserted into the fabric.

A greater length of weft is available in the first pick by reason of the tail of weft left between the cutter 83 and the trapper 38. This enables the first pick to extend from the finger 86 to the selvedge 40, and then across the fabric. Since the part of weft between the selvedge 40 and the finger 86 goes to form part of the second pick, the second limb of the loop may be shorter, and is cut off by the cutter 83 short of the trapper 38, leaving a tail of weft for the first pick of the next loop, and so on.

What I claim and desire to secure by Letters Patent is:—

1. Weft measuring apparatus for a shuttleless loom comprising weft drawing means adapted to draw from a supply towards the fell of a fabric loops of weft sufficient for two picks of weft in said fabric, a single movable trapper adapted to grip the weft, means for actuating said trapper to carry the weft across the path of said drawing means, weft cutting means, and means for actuating said cutting means to cut one limb of each loop when the other limb has been inserted as a pick into the fabric, said weft cutting means being disposed past said trapping means along the path of said drawing means so as to sever such loops with unequal limb lengths, the amount of weft available in the first limb for the first pick being substantially greater than the amount of weft in the second limb.

2. Weft measuring apparatus for a shuttleless loom comprising weft drawing means adapted to draw from a supply towards the fell of a fabric loops of weft sufficient for two picks of weft in said fabric, a single movable trapper adapted to grip the weft, means for actuating said trapper to carry the weft across the path of said drawing means, weft cutting means and means for actuating said cutting means to cut one limb of each loop after the other limb has been inserted as a pick into the fabric and after said movable trapper has gripped the limb to be cut and has carried the weft again across the path of the drawing means, said weft cutting means being disposed past said trapping means along the path of said drawing means so as to sever such loops with unequal limb lengths, the amount of weft available in the first limb for the first pick being substantially greater than the amount of weft in the second limb.

3. Weft measuring apparatus for a shuttleless loom comprising weft drawing means adapted to draw from a supply towards the fell of a fabric loops of weft sufficient for two picks of weft in said fabric, a single movable trapper adapted to grip the weft, means for actuating said trapper to carry the weft across the path of said drawing means, means for releasing loops of weft when fully drawn by said drawing means, weft cutting means disposed past said trapping means along the path of said drawing means, means for actuating said cutting means to cut one limb of each loop when the other limb has been inserted as a pick into the fabric, a depressor adapted to depress the limbs in turn for insertion into the fabric, and guide means adapted to guide the second limb under said depressor as the first limb is inserted.

4. Weft measuring apparatus for a shuttleless loom comprising weft drawing means adapted to draw from a supply towards the fell of a fabric loops of weft sufficient for two picks of weft in said fabric, a single movable trapper adapted to grip the weft, means for actuating said trapper to carry the weft across the path of said drawing means, means for releasing loops of weft when fully drawn by said drawing means, weft cutting means disposed past said trapping means along the path of said drawing means, means for actuating said cutting means to cut one limb of each loop when the other limb has been inserted as a pick into the fabric, a finger near the fell of said fabric, and means for inserting said finger into each loop prior to insertion of the first limb and for withdrawing said finger prior to insertion of the second limb.

5. Weft measuring apparatus for a shuttleless loom comprising weft drawing means adapted to draw loops of weft from a supply, a single movable trapper adapted to grip the weft, means for actuating said trapper to carry the weft across the path of said drawing means, means for releasing loops of weft when fully drawn by said drawing means, weft cutting means disposed at some distance along the path of said drawing means past said trapper, means for actuating said cutting means after a loop is fully drawn by said drawing means, a stationary trapper, and means for actuating said trapper to control the weft when it is released by said movable trapper.

6. Weft measuring apparatus for a shuttleless loom comprising weft drawing means adapted to draw loops of weft from a supply each sufficient to form one pick in a fabric, a single movable trapper adapted to grip the weft, means for actuating said trapper to carry the weft across the path of said drawing means, means for releasing loops of weft when fully drawn by said drawing means, and weft cutting means adapted to cut from the supply alternate loops of weft when drawn so that the loops remain connected together in pairs and form pairs of connected picks in the fabric.

7. Weft measuring apparatus for a shuttleless loom comprising weft drawing means adapted to draw loops of weft from a supply each sufficient to form a single pick in a fabric, a single movable trapper adapted to grip the weft, means for actuating said trapper to carry the weft across the path of said drawing means, means for releasing loops of weft when fully drawn by said drawing means, weft cutting means disposed at some distance along the path of said drawing means past said trapper, and means for actuating said cutting means after a loop is fully drawn by said drawing means.

8. Weft measuring apparatus for a shuttleless loom comprising weft drawing means adapted to draw loops of weft from a supply each sufficient to form one pick in a fabric, a single movable trapper adapted to grip the weft, means for actuating said trapper to carry the weft across the path of said drawing means, means for releasing loops of weft when fully drawn by said drawing means, weft cutting means adapted to cut from the supply alternate loops of weft when drawn so that the loops remain connected together and form pairs of connected picks in the fabric, a stationary trapper, and means for actuating said trapper to control the weft when it is released by said movable trapper.

9. Weft measuring apparatus for a shuttleless loom comprising weft drawing means adapted to draw loops of weft from a supply each sufficient to form a single pick in a fabric, a single movable trapper adapted to grip the weft, means for actuating said trapper to carry the weft across the path of said drawing means, means for releasing loops of weft when fully drawn by said drawing means, weft cutting means disposed at some distance along the path of said drawing means past said trapper, means for actuating said cutting means after a loop is fully drawn by said drawing means, a stationary trapper and means for actuating said trapper to control the weft when it is released by said movable trapper.

WILLIAM POOL.